(12) United States Patent
Wells et al.

(10) Patent No.: US 11,124,951 B2
(45) Date of Patent: Sep. 21, 2021

(54) SPRING STEEL SLEEVE DESIGN

(71) Applicant: Caterpillar Inc., Deerfield, IL (US)

(72) Inventors: Corey Michael Wells, Peoria, IL (US);
Jason Grant Jura, Peoria, IL (US);
Eric T. Sinn, Tremont, IL (US);
Douglas C. Serrurier, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 96 days.

(21) Appl. No.: 16/392,959

(22) Filed: Apr. 24, 2019

(65) Prior Publication Data
US 2020/0340219 A1 Oct. 29, 2020

(51) Int. Cl.
*F16F 1/02* (2006.01)
*E02F 9/28* (2006.01)
*F16B 21/18* (2006.01)

(52) U.S. Cl.
CPC ............ *E02F 9/2841* (2013.01); *F16B 21/18* (2013.01); *F16F 1/025* (2013.01)

(58) Field of Classification Search
CPC .. F16F 1/025; F16F 1/027; F16F 1/328; F16F 1/34; E02F 9/2841; F16B 21/18; F16D 65/0018
USPC .......................................... 188/73.36–73.38
See application file for complete search history.

(56) References Cited

U.S. PATENT DOCUMENTS

| | | | |
|---|---|---|---|
| 3,751,834 A * | 8/1973 | Petersen | E02F 9/2841 37/458 |
| 3,893,211 A | 7/1975 | Skinner | |
| 3,997,989 A | 12/1976 | Stepe | |
| 4,050,172 A * | 9/1977 | Petersen | E02F 9/2841 37/458 |
| 4,096,653 A | 6/1978 | Kaarlela et al. | |
| 4,338,736 A | 7/1982 | Radigan | |
| 4,367,602 A * | 1/1983 | Petersen | E02F 9/2841 24/580.1 |
| 4,408,681 A * | 10/1983 | Oshima | F16D 65/0977 188/73.38 |
| 4,422,534 A * | 12/1983 | Oshima | F16D 65/0977 188/73.38 |
| 4,940,120 A * | 7/1990 | Schmidt | F16D 65/0977 188/1.11 L |
| 5,435,084 A | 7/1995 | Immel | |
| 6,283,256 B1 * | 9/2001 | Dahlheimer | F16D 55/226 188/73.38 |
| 7,451,558 B2 | 11/2008 | Jones | |

(Continued)

FOREIGN PATENT DOCUMENTS

| | | |
|---|---|---|
| CN | 103608527 | 2/2014 |
| DE | 3303254 | 8/1984 |

(Continued)

OTHER PUBLICATIONS

U.S. Appl. No. 29/688,806, filed Apr. 24, 2019. (Unpublished).

*Primary Examiner* — Xuan Lan Nguyen
(74) *Attorney, Agent, or Firm* — Law Office of Kurt J. Fugman LLC

(57) ABSTRACT

A spring includes a first spring arm extending from the first side edge of the flat base, the first spring arm including a first arcuate portion extending from the flat base, a first straight portion extending from the first arcuate portion and disposed proximate to the rear face, the first straight portion defining a first obtuse angle with the rear face, and a first straight portion length.

16 Claims, 14 Drawing Sheets

(56) References Cited

U.S. PATENT DOCUMENTS

| | | |
|---|---|---|
| 7,596,895 B2 | 10/2009 | Jones et al. |
| 7,926,207 B2 | 4/2011 | Lopez Almendros et al. |
| 8,397,405 B2 | 3/2013 | Harder et al. |
| 9,222,243 B2 | 12/2015 | Cheyne et al. |
| 10,106,960 B2 | 10/2018 | Jeske et al. |
| 2007/0205061 A1* | 9/2007 | Yagi .................. F16D 55/22 188/73.38 |
| 2014/0259811 A1 | 9/2014 | Ballinger |

FOREIGN PATENT DOCUMENTS

| | | | | |
|---|---|---|---|---|
| GB | 1215839 A | * | 12/1970 | ............ E02F 9/2841 |
| WO | 2016089669 | | 6/2016 | |

* cited by examiner

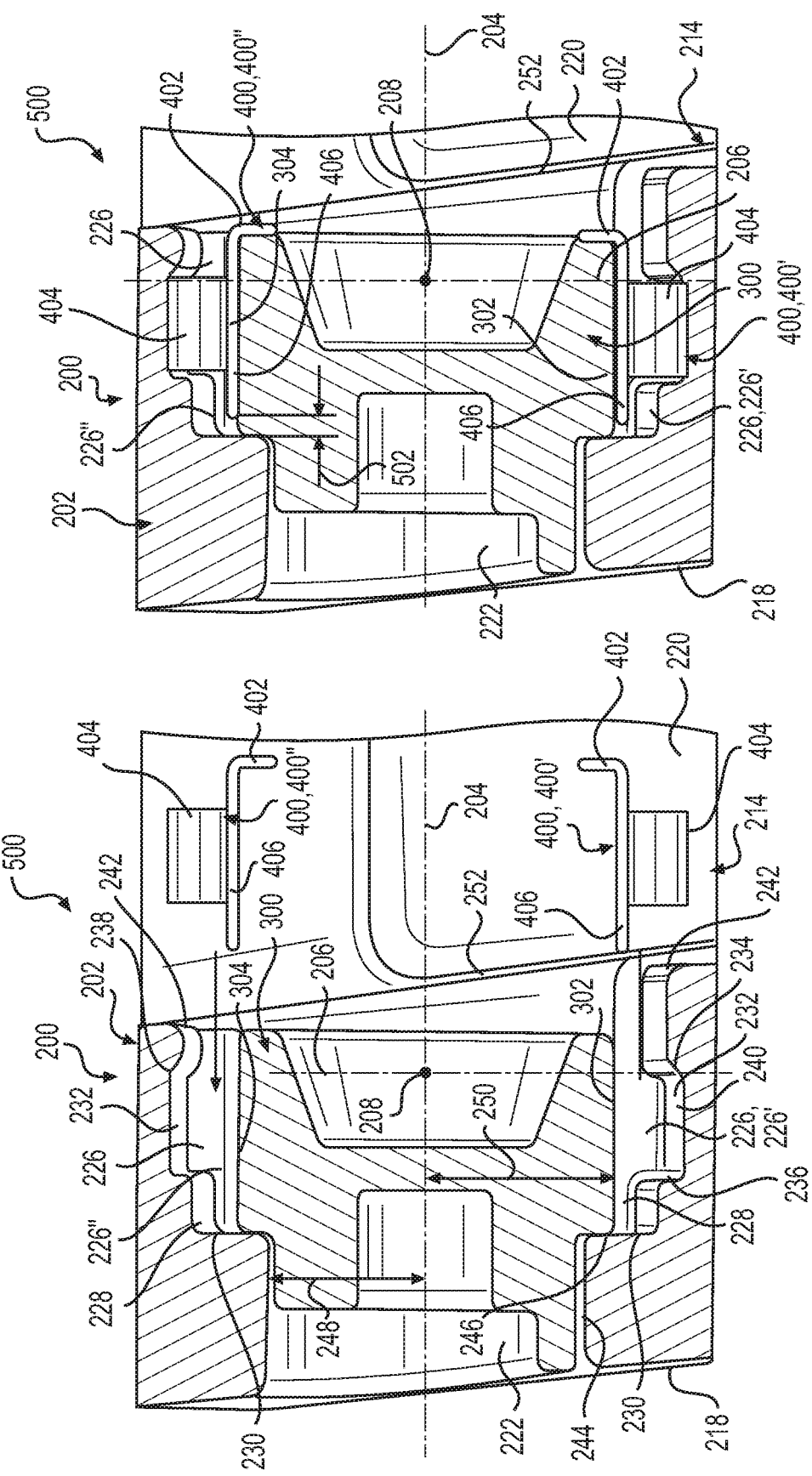

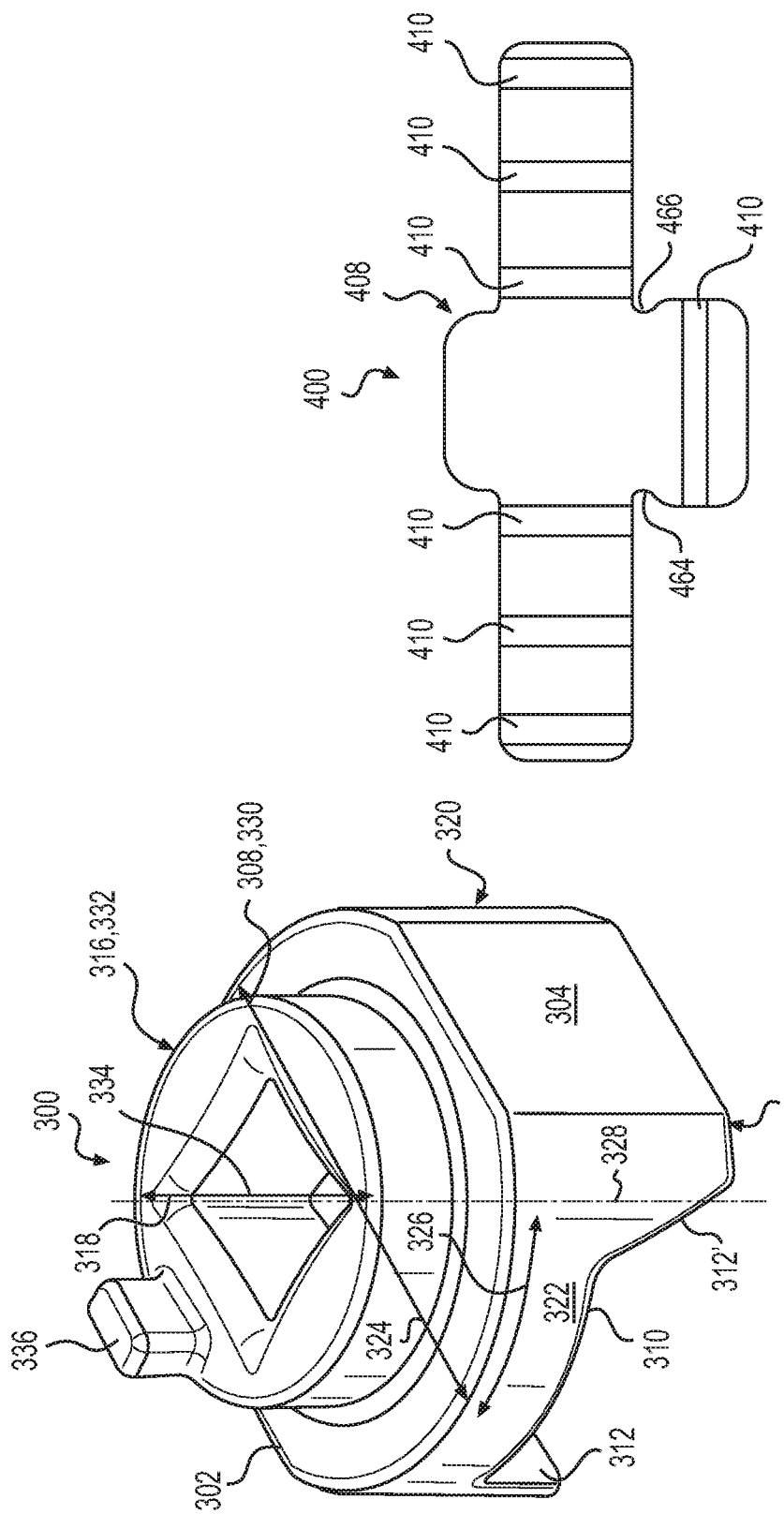

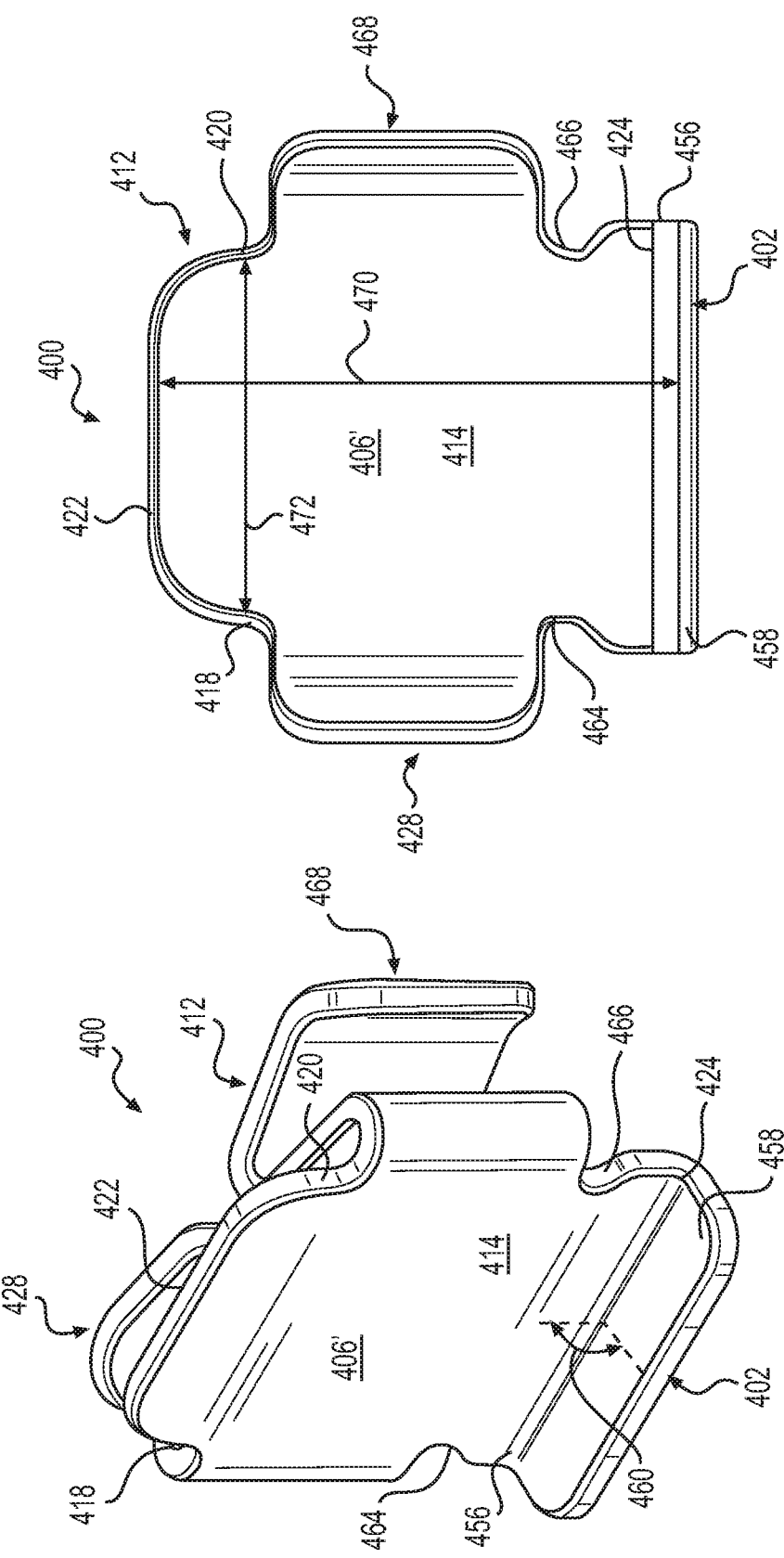

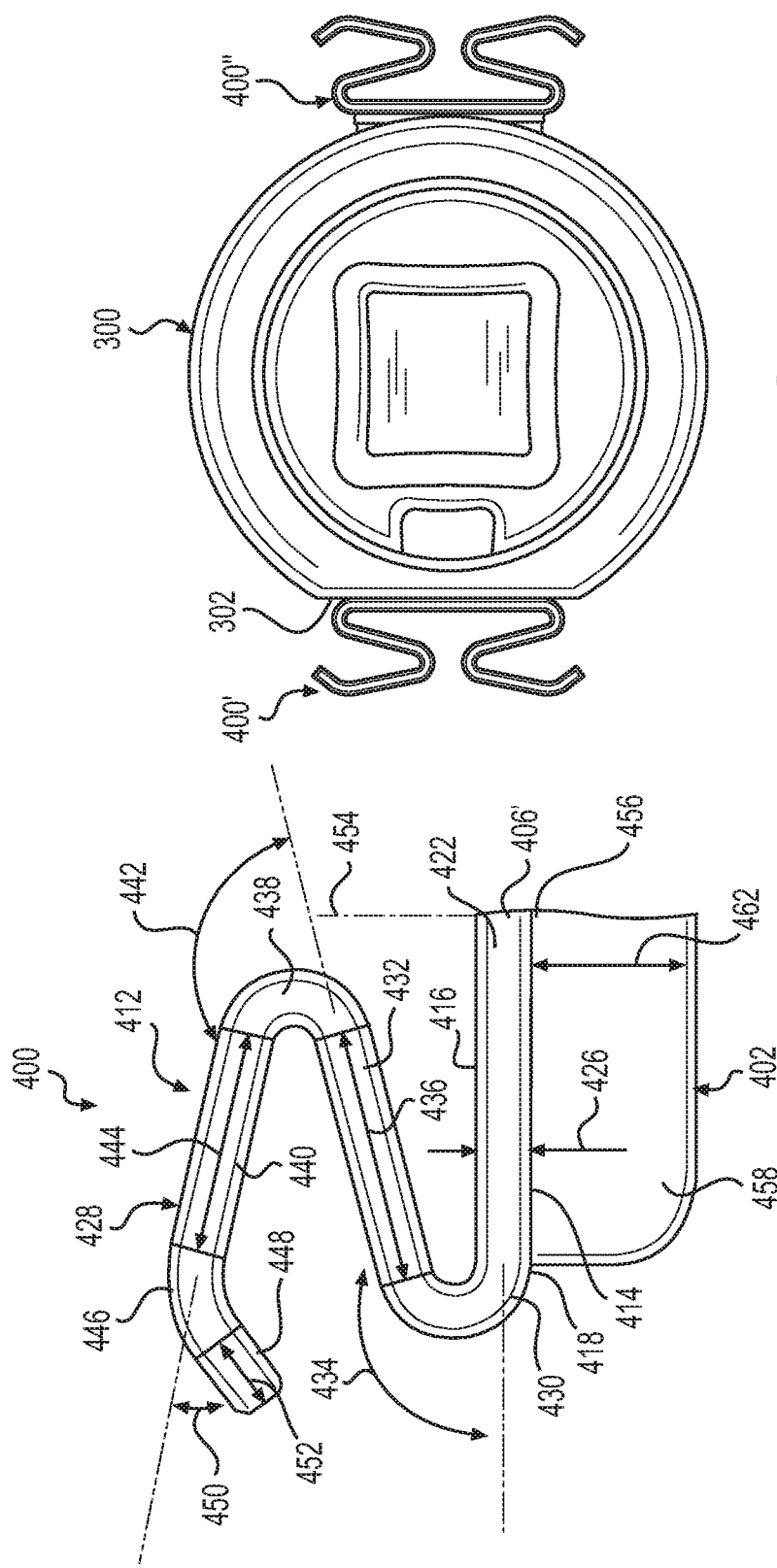

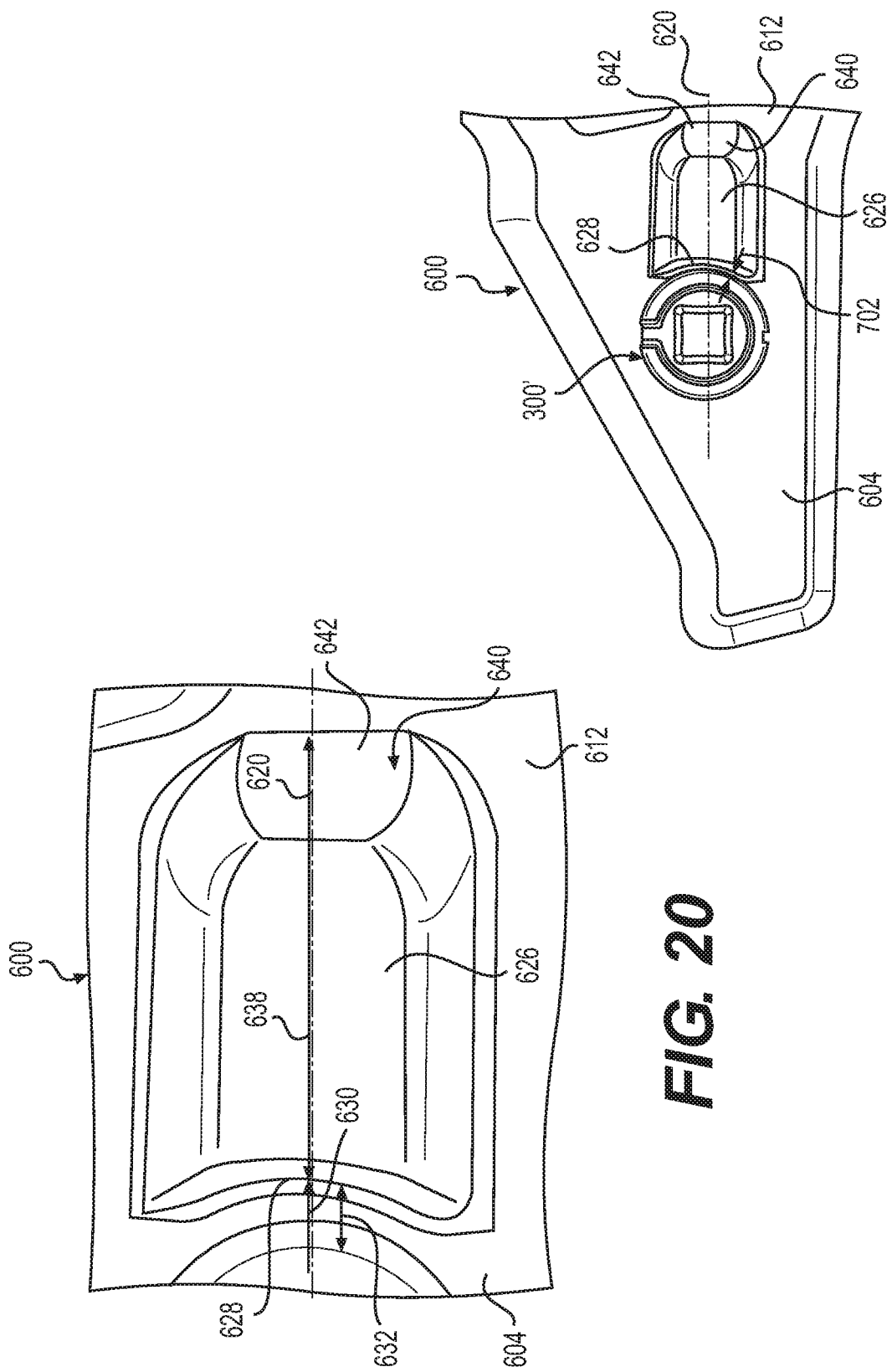

SPRING STEEL SLEEVE DESIGN

TECHNICAL FIELD

The present disclosure relates to retaining mechanisms employed on work implement assemblies such as bucket assemblies used by earth moving, mining, construction equipment and the like for attaching a tip to an adapter of the work implement assembly. More specifically, the present disclosure relates to a retaining mechanism that uses a spring steel sleeve design to hold a retainer of the retaining mechanism in a locked or unlocked configuration.

BACKGROUND

Machines such as wheel loaders, excavators, and the like employ work implement assemblies including bucket assemblies, rakes, shears, etc. that have teeth or tips attached to them to help perform work on a material such as dirt, rock, sand, etc. For example, teeth or tips may be attached to a bucket assembly to help the bucket assembly to penetrate the ground, facilitating the scooping of the dirt into a bucket. Adapters are often attached to the work edges (e.g. the base edge, the side edge, etc.) of the bucket or other work implement so that different styles of teeth or tips may be attached to the work implement. Also, the tips or teeth may be replaced easily when worn by providing a retaining mechanism that is used to selectively hold the tip onto the adapter or to allow the tip be removed from the adapter.

U.S. Pat. No. 9,222,243 B2 discloses a wear assembly for use on various kinds of earth working equipment that includes a base with a supporting portion, a wear member with a cavity into which the supporting portion is received, and a lock to releasably secure the wear member to the base. The supporting portion is formed with the top and bottom recesses that receive complementary projections of the wear member. These recesses and projections include aligned holes so as to receive and position the lock centrally within the wear assembly and remote from the wear surface. The lock includes a mounting component that defines a threaded opening for receiving a threaded pin that is used to releasably hold the wear member to the base. A retaining clip is provided to prevent rotation of the mounting component.

However, the retaining clip in the '243 patent does not solve all problems associated with the retaining mechanisms such as preventing the packing of mud or other material into the retaining mechanism, which may hinder its performance. Furthermore, the retaining clip in the '243 may increase the force necessary to unlock the retaining mechanism to an undesirable extent, etc.

SUMMARY OF THE DISCLOSURE

A spring according to an embodiment of the present disclosure comprises a folded body including a flat base defining a front face, a rear face, a first side edge, a second side edge, a top edge, a bottom edge, and a flat base thickness measured from the front face to the rear face; and a first spring arm extending from the first side edge of the flat base, the first spring arm including a first arcuate portion extending rearwardly from the flat base, a first straight portion extending from the first arcuate portion and disposed proximate to the rear face, the first straight portion defining a first external obtuse angle with the rear face, and a first straight portion length.

A spring according to another embodiment of the present disclosure comprises a folded body including a flat base defining a front face, a rear face, a first side edge, a second side edge, a top edge, a bottom edge; and a first spring arm extending from the first side edge of the flat base, the first spring arm including a first arcuate portion extending rearwardly from the flat base, a first straight portion extending from the first arcuate portion and disposed proximate to the rear face, and a second arcuate portion extending rearwardly from the first straight portion, and a second straight portion extending from the second arcuate portion and disposed proximate to the first straight portion such that the first spring arm forms a first serpentine path.

A spring loaded retainer according to an embodiment of the present disclosure comprises a lug receiving portion defining a first maximum outside dimension, the lug receiving portion also defining a lug receiving slot that extends partially through the lug receiving portion, forming a first sidewall, a second sidewall, and a catch surface connecting the first sidewall to the second sidewall; a drive portion defining a second maximum outside dimension; and a first flat disposed on the outside of the lug receiving portion proximate to the first sidewall or the second sidewall.

BRIEF DESCRIPTION OF THE DRAWINGS

FIG. 5 is an enlarged detail view of the tip of FIG. 4 illustrating a retaining mechanism and its components being assembled into the retaining mechanism receiving aperture of the tip. The spring loaded retainer is shown in an unlocked configuration.

FIG. 6 depicts the retaining mechanism of FIG. 5 fully assembled into the retaining mechanism receiving aperture of the tip. The spring loaded retainer is shown in the unlocked configuration.

FIG. 9 is a perspective view of the spring loaded retainer of FIGS. 5 thru 8 shown in isolation. Two flats are employed for this embodiment of the spring loaded retainer.

FIG. 10 is a flat pattern of the spring of FIGS. 5 thru 8 before being bent into a desired shape.

FIG. 11 is a perspective view of the spring of FIGS. 5 thru 8 after being bent into a desired shape.

FIG. 12 is a front view of the spring of FIG. 11.

FIG. 13 is a partial enlarged top view of the spring of FIG. 11 showing the configuration of a spring arm that extends from the base of the spring more clearly.

FIG. 14 illustrates two springs that are identically configured to the spring of FIG. 11 used to hold a spring loaded retainer according to another embodiment of the present disclosure with only one flat.

FIG. 20 is an enlarged side detail view of the lug and the rail on the nose of adapter of FIG. 19 so that the arcuate profile of the front portion of the rail may be more clearly seen.

FIG. 21 shows a spring loaded retainer mounted on the lug of the nose of the adapter of FIG. 20, illustrating how the arcuate profile of the front portion of the rail allows the spring loaded retainer to rotate while helping to prevent mud or other debris from entering the tip from behind the tip.

DETAILED DESCRIPTION

Figure 1:
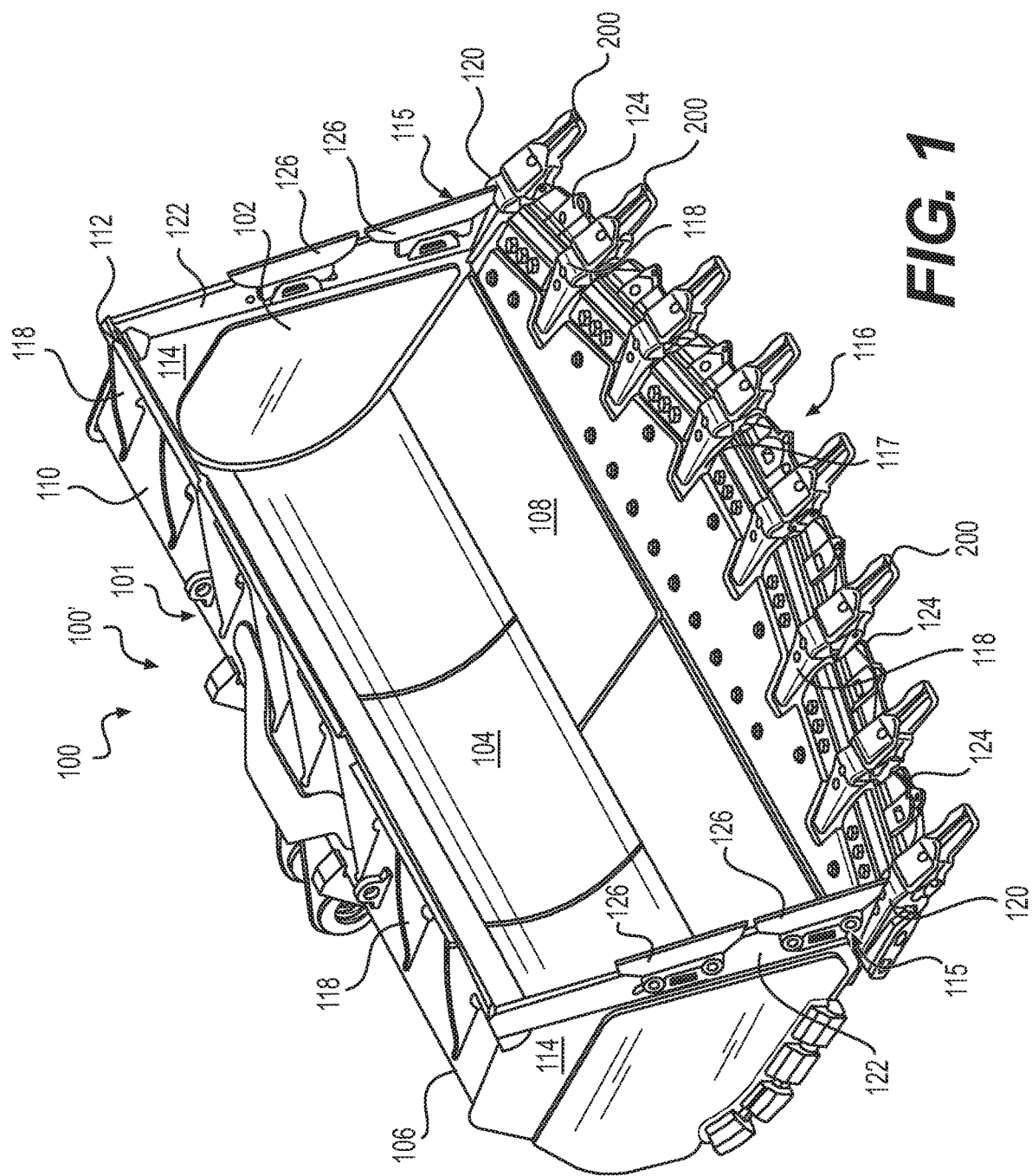
FIG. 1 is a perspective view of a work implement assembly such as a bucket assembly using tips, adapters, and retaining mechanisms with components configured according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

A work implement assembly using tips according to various embodiments of the present disclosure will now be discussed.

Starting with FIG. 1, the work implement assembly 100 may take the form of a bucket assembly 100' that may be used by a wheel loader and that includes an enclosure 101 that defines an opening 102 that communicates with a generally enclosed interior. Starting from the rear of the bucket assembly 100 as shown in FIG. 1, the bucket assembly 100 includes a curved shell profile 104, which is attached to a rear wall 106 at the top end of the shell 104. The other end of the shell is attached to the bottom plate 108 of the assembly 100. A top plate 110 is attached to the top end of the rear wall 106. The top plate 110 transitions to a spill guard 112 that is designed to funnel material into the interior of the bucket and prevent material from spilling out of the bucket. Reinforcing ribs 118 are provided that are attached to the top plate 110 and the spill guard 112, providing reinforcement for strength. Two substantially flat end plates 114 are attached to the side edges of the spill guard 112, top plate 110, rear wall 106, bottom plate 108 and shell 104.

A side edge assembly 115 is attached to each end plate 114 while a front edge assembly 116 is attached to the front edge of the bottom plate 108 of the bucket assembly 100. The front edge assembly 116 includes a base edge 117 that is attached to the bottom plate 108, a plurality of center adapters 118 attached to the base edge 117, and a plurality of tips 200 (may also be referred to as tools, teeth, etc.) with each one of the plurality of tips 200 being attached to one of the plurality of center adapters 118. Also, two corner adapters 120 are also attached to the base edge and the side edges 122 of the bucket assembly 100'. Tip 200 may also be attached to the corner adapters 120.

Moreover, a plurality of base edge protectors 124 are also provided with each one of the base edge protectors 124 positioned between center adapters 120 and between a center adapter 120 and a corner adapter 120. A side edge protector 126 is also provided that is attached to the side edge 122 proximate to a corner adapter 120.

It is to be understood that the work implement assembly may take other forms other than a bucket assembly including rake assemblies, shear assemblies, etc. In addition, a differently configured bucket that is meant to be used by an excavator may also use various embodiments of a tip, retaining mechanism, adapter, spring, spring loaded retainer, tip assembly, and tip and adapter assembly, etc. as will be discussed herein.

A tip 200 according to an embodiment of the present disclosure will now be discussed with reference to FIGS. 2 thru 8, 15, and 16 that may be used with a spring loaded retainer 300 and a spring 400 according to various embodiments of the present disclosure.

Figure 2:
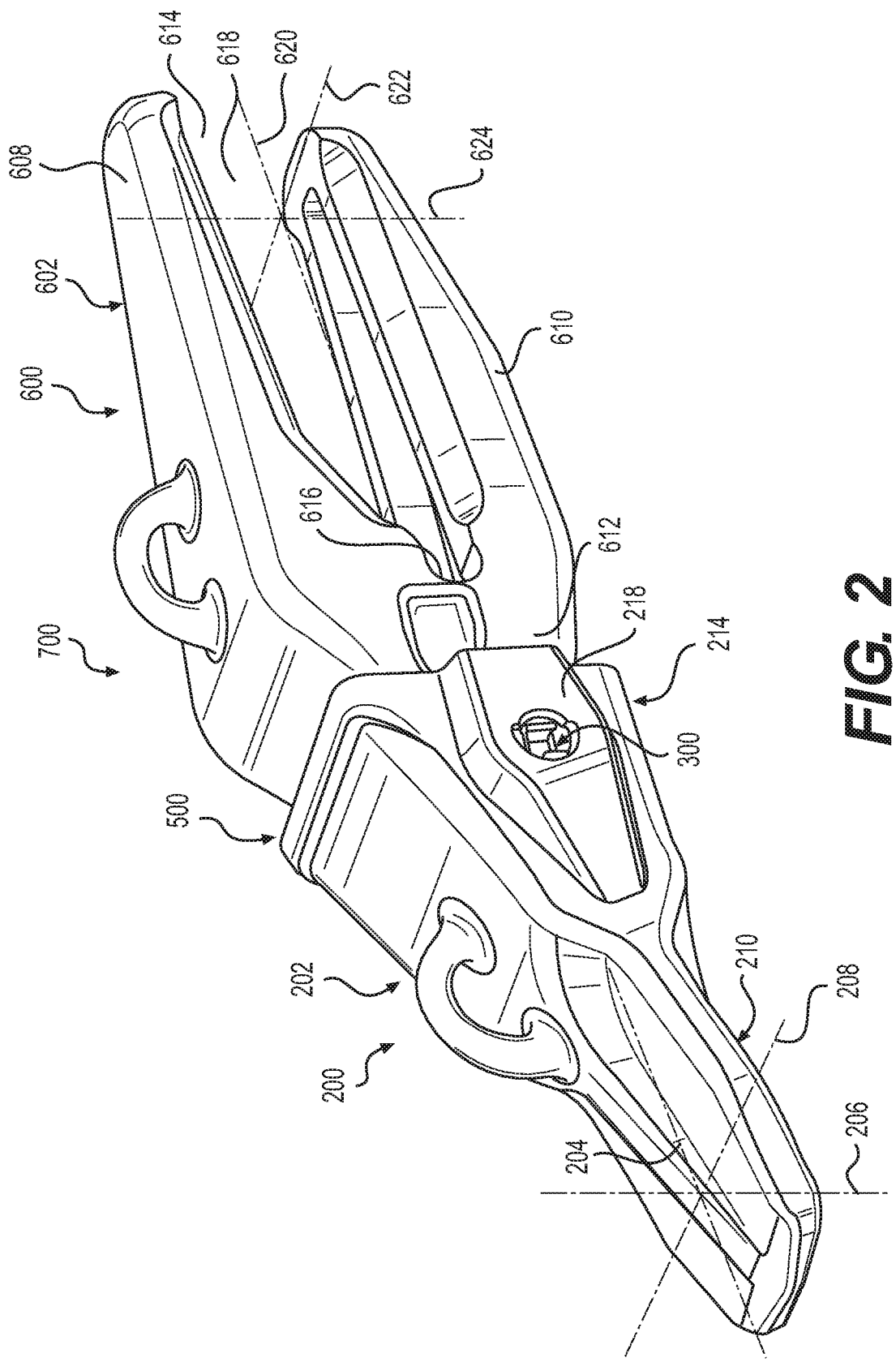
FIG. 2 is a perspective view of a tip and adapter subassembly of FIG. 1, shown in isolation from the work implement assembly of FIG. 1.
Figure 3:
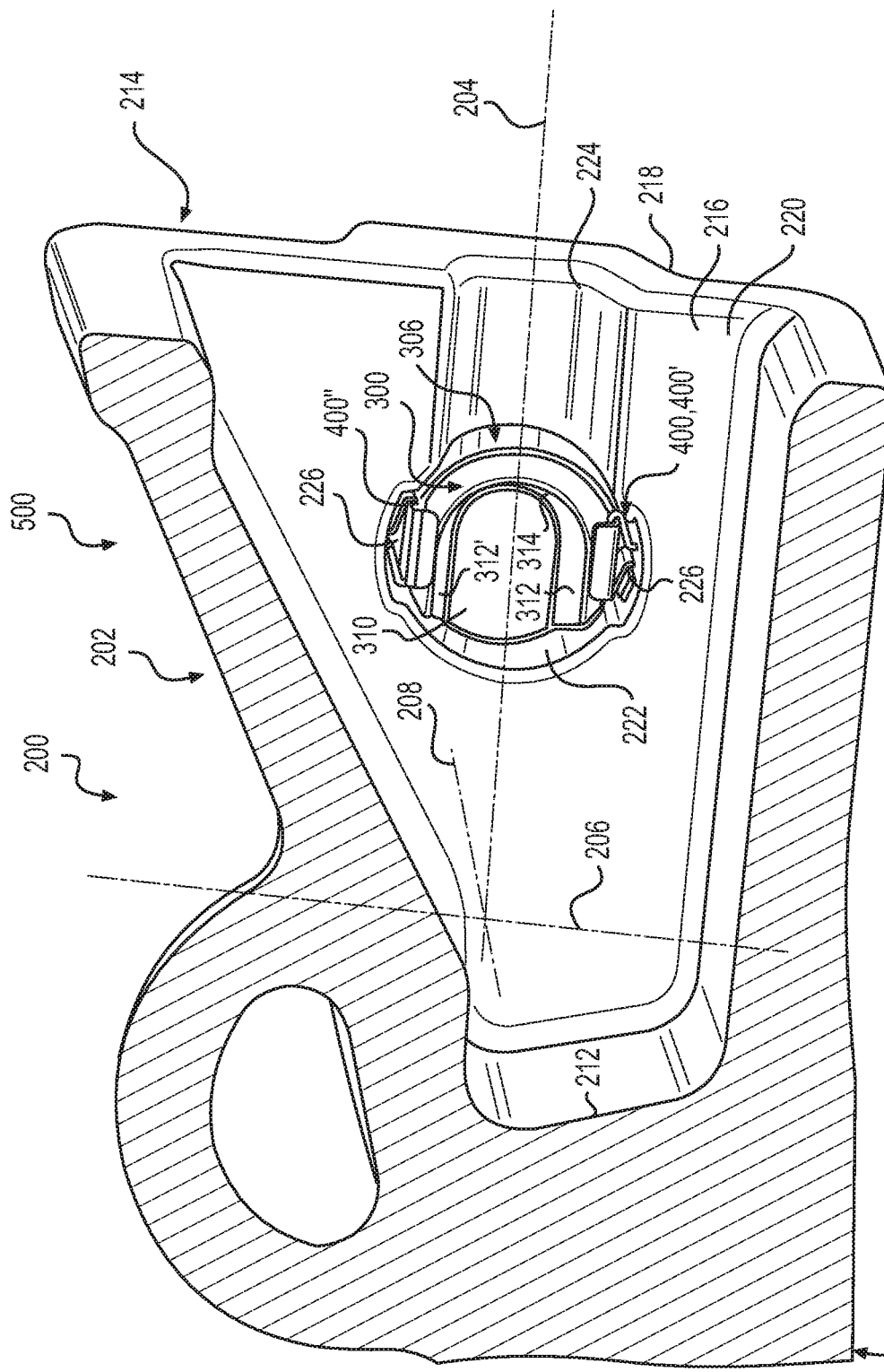
FIG. 3 is a side sectional view of the tip of FIG. 2 without the adapter, showing a retaining mechanism and its components according to an embodiment of the present disclosure in a locked configuration.
Figure 4:
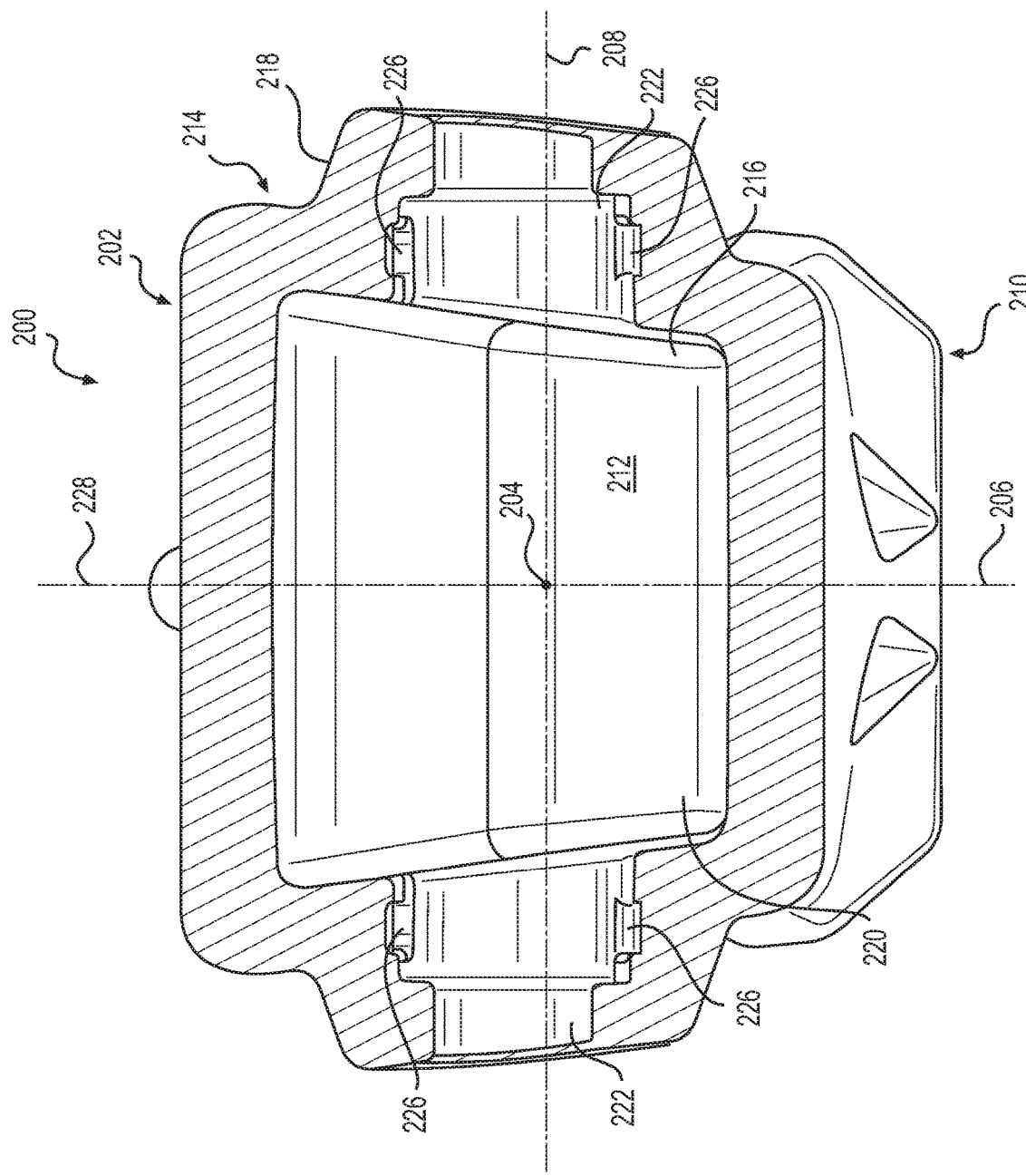
FIG. 4 is a rear sectional view of the tip of FIG. 3 without any retaining mechanism being shown, revealing more clearly the retaining mechanism receiving apertures of the tip.

Starting with FIGS. 2 thru 6, the tip 200 may comprise a body 202 that defines a longitudinal axis 204, a vertical axis 206 that is perpendicular to the longitudinal axis 204, and a lateral axis 208 that is perpendicular to the vertical axis 206, and the longitudinal axis 204. The body 202 may include a forward working portion 210 disposed along the longitudinal axis 204 including a closed end 212, and a rear attachment portion 214 disposed along the longitudinal axis 204 including an open end 216. As best seen in FIG. 4, the body 202 may define a vertical plane of symmetry 228. This may not be the case in other embodiments of the present disclosure.

Focusing on FIGS. 3 thru 6, the rear attachment portion 214 defines an exterior surface 218, an adapter nose receiving pocket 220 extending longitudinally from the open end 216, and a retaining mechanism receiving aperture 222 in communication with the adapter nose receiving pocket 220 and the exterior surface 218. An adapter nose lug receiving groove 224 may extend longitudinally from the open end 216 to the retaining mechanism receiving aperture 222. At least one spring receiving slot 226 may be in communication with the retaining mechanism receiving aperture 222 and the adapter nose receiving pocket 220.

Looking at FIG. 5, the at least one spring receiving slot 226 includes a spring base receiving portion 228 extending laterally from the adapter nose receiving pocket 220 and terminating at a vertical face 230. Also, a spring arm receiving portion 232 may extend vertically from the spring base receiving portion 228 and terminate laterally at a first vertical surface 234 disposed laterally between the adapter nose receiving pocket 220 and the vertical face 230. The spring arm receiving portion 232 may also terminate laterally at a second vertical surface 236 disposed laterally between the first vertical surface 234 and the vertical face 230 of the adapter nose receiving pocket 220.

The body 202 may define an upper vertical extremity 238 of the retaining mechanism receiving aperture 222, and a lower vertical extremity 240 of the retaining mechanism receiving aperture 222. The at least one spring receiving slot 226 may be disposed proximate to the upper vertical extremity 238 or the lower vertical extremity 240. In some embodiments such as shown in FIG. 5, two such slots are provided with one at the upper vertical extremity and one at the lower vertical extremity.

In some embodiments, the at least one spring receiving slot 226 may be disposed proximate to the lower vertical extremity 240. The body 202 may include a lead-in surface 242 (e.g. a fillet or a chamfer, etc.) extending from the adapter nose receiving pocket 220 to the spring base receiving portion 228 of the at least one spring receiving slot 226.

With continued reference to FIG. 5, the retaining mechanism receiving aperture 222 includes a first cylindrical portion 244 extending from the exterior surface 218, a second cylindrical portion 246 extending from the adapter nose receiving pocket 222 to the first cylindrical portion 244. Hence, the adapter nose receiving pocket 220 is in communication with the exterior of the tip 220 through the retaining mechanism receiving aperture 222. For the embodiment shown in FIG. 5, the first cylindrical portion 244 defines a first cylindrical portion radius 248, and the second cylindrical portion 246 defines a second cylindrical portion radius 250 that is greater than first cylindrical portion radius 248, forming the vertical face 230. Other configurations are possible in other embodiments of the present disclosure.

Next, referring to FIGS. 2, 3, 5 and 6, a tip assembly 500 according to an embodiment of the present disclosure will now be discussed. The tip assembly 500 may comprise a tip 200 that is configured similarly to what has just been previously described herein. In addition, looking at FIGS. 3, 5 and 6, the tip assembly 500 may comprise a spring loaded retainer 300 that is disposed in the retaining mechanism receiving aperture 222. The spring loaded retainer 300 may be configured to be accessible from the exterior surface 218 so that a user may use a tool to drive or rotate the spring loaded retainer from an unlocked to a locked configuration, or vice versa. A spring 400 may be disposed in the at least one spring receiving slot 226 such that the spring 400 is interposed vertically between the body 202 of the tip 200 and the spring loaded retainer 300.

In FIGS. 5 and 6, the spring 400 may also include a flange portion 402 disposed laterally between spring loaded retainer 300 and the adapter nose receiving pocket 220, helping to keep the spring loaded retainer 300 properly retained in the tip 200. Also, the spring 400 may include at least one spring arm 404 vertically disposed in the spring arm receiving portion 232 of the at least one spring receiving slot 226, and laterally proximate to the first vertical surface 234. Hence, the spring 400 is biased to be held in position while also holding the spring loaded retainer 300 in position. A base 406 may be disposed in the spring base receiving portion 228 of the at least one spring receiving slot 226. The base 406 may contact the spring loaded retainer 300, helping to take up any stack up tolerances between the spring loaded retainer 300 and the tip 200, and to cause resistance from unintentionally rotating the spring loaded retainer 300, etc. The spring arm receiving portion 232 also terminates laterally at a second vertical surface 236 disposed laterally between the first vertical surface 234 and the vertical face 230 of the adapter nose receiving pocket 220, and the at least one spring arm 404 is disposed laterally proximate to the second vertical surface 236, helping to prevent movement of the spring 400 toward the exterior of the tip 200.

In FIG. 6, the base 406 of the spring 400 may be spaced laterally away from the vertical face 230 a predetermined distance 502 ranging from 0 mm to 6.5 mm. This distance may be varied to be different in other embodiments of the present disclosure, or the base 406 may contact the vertical face 230 in other embodiments of the present disclosure such as when the second vertical surface 236 is coextensive with the vertical face 230.

The at least one spring receiving slot 226 may take the form of a first spring receiving slot 226' disposed proximate to the lower vertical extremity 240 of the retaining mechanism receiving aperture 222. The at least one spring 400 may include a first spring 400' that is disposed in the first spring receiving slot 226' disposed proximate to the lower vertical extremity 240. The body 202 of the tip 200 may include a lead-in surface 242 extending from the adapter nose receiving pocket 220 to the spring base receiving portion 228 of the at least one spring receiving slot 226.

A second spring receiving slot 226" may be disposed proximate to the upper vertical extremity 238, and a second spring 400" may be disposed in the second spring receiving slot 226" that also contacts the spring loaded retainer 300.

The first spring 400' may be identical to the second spring 400" but not necessarily so. Likewise, the first spring receiving slot 226' may be similarly configured as the second spring receiving slot 226'. That is to say, the slots are virtually identical except that they are bounded by an angled surface 252 forming the adapter nose receiving pocket so that the second spring receiving slot looks slightly different than the first spring receiving slot. This may not be the case in other embodiments and the configurations of the various springs and their associated slots may be tailored as needed to be different than what is shown in FIG. 6 for other applications, etc.

For example, in FIGS. 5 and 6, the spring loaded retainer 300 includes a first flat 302 and the base 406 of the spring 400 contacts the first flat 302 of the spring loaded retainer 300. Furthermore, the spring loaded retainer 300 may include a second flat 304 and the second spring 400" may contact the second flat 304. In such an embodiment, FIG. 5 illustrates how the springs 400', 400" may be assembled into the tip 200 by rotating the spring loaded retainer 300 so that its flats 302, 304 are positioned at the top and bottom positions. So, interference between the springs 400', 400" and the spring loaded retainer 300 is minimized, reducing the amount of assembly force necessary.

Figure 8:
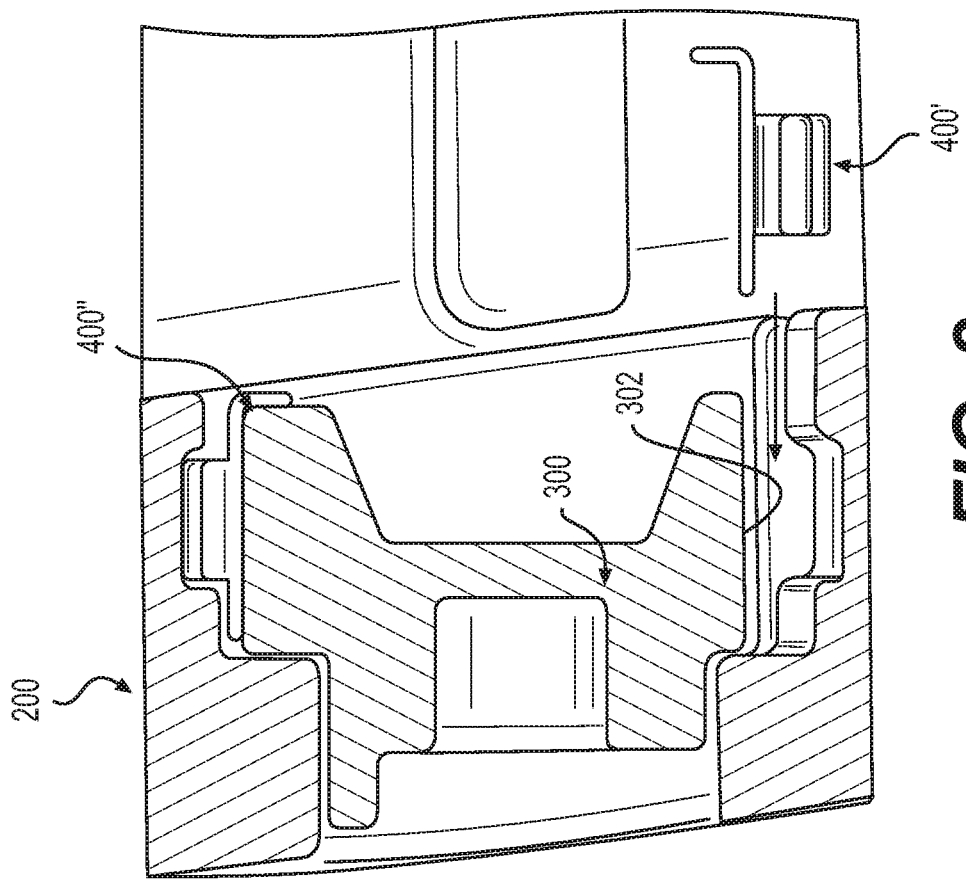
FIG. 8 is a rear sectional view similar to FIG. 6 except that the spring loaded retainer is now in the unlocked configuration and a second spring is being inserted into the retaining mechanism receiving aperture with the spring loaded retainer in the unlocked configuration.
Figure 7:
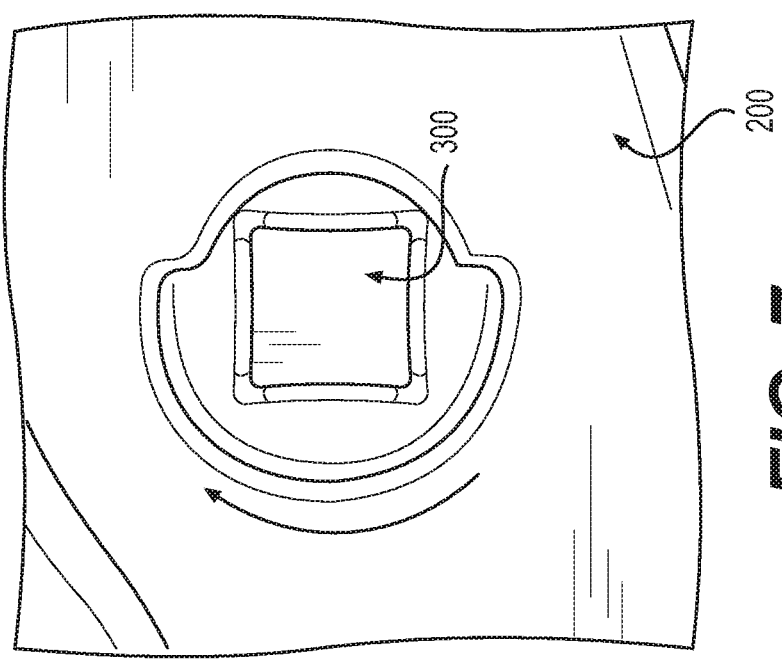
FIG. 7 is a side view of the tip and the spring loaded retainer of FIG. 6 with the spring loaded retainer being rotated into a locking configuration.

FIGS. 8 and 14 illustrate that when two springs 400', 400" are used with a spring loaded retainer 300 having only one flat 302, it is easier to assemble one spring 400' after the flat 302 is aligned with the slot into which the spring is going to be inserted. Once the first spring 400' is properly assembled, then the spring loaded retainer 300 is rotated so that the flat 302 is oriented with the opposite slot, easing the assembly of the second spring 400" into that slot, or vice versa.

Figure 16:
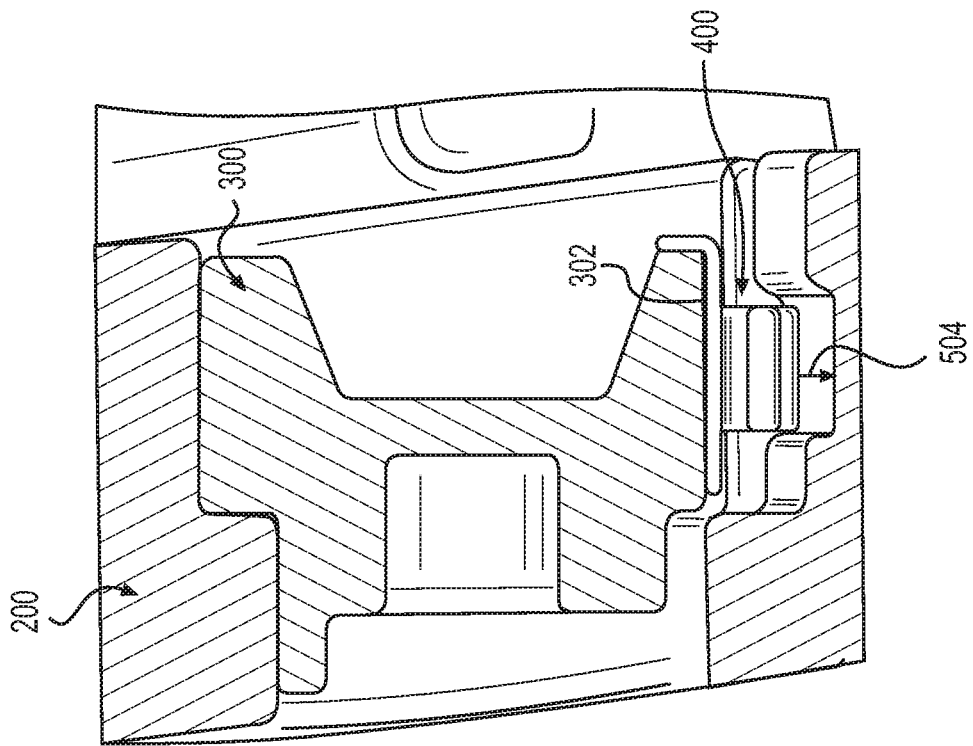
FIG. 16 illustrates the upward movement of the spring, contacting the flat of the spring loaded retainer such as shown on the left side of FIG. 14.
Figure 15:
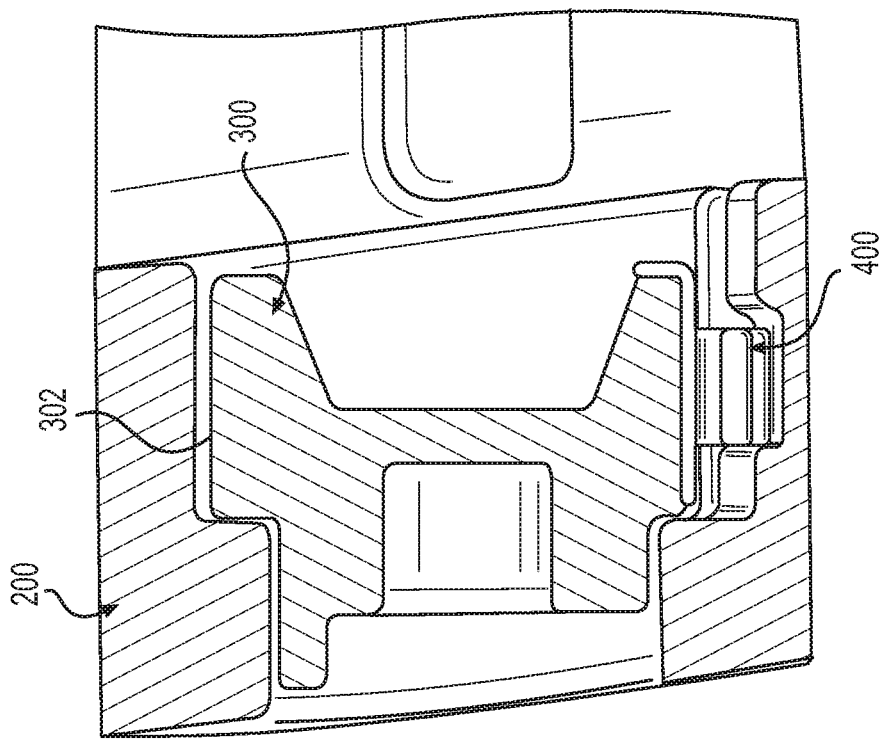
FIG. 15 illustrates a spring contacting a spring loaded retainer tangentially such as shown on the right side of FIG. 14.

FIGS. 15 and 16 show an embodiment where only a single spring 400 and flat 302 on the spring loaded retainer 300 are used. Specifically, FIG. 15 illustrates a spring 400 contacting a spring loaded retainer 300 tangentially such as shown on the right side of FIG. 14, while FIG. 16 illustrates the movement of the spring 400, contacting the flat 302 of the spring loaded retainer 300 such as shown on the left side of FIG. 14. When assembling the embodiment shown in FIGS. 15 and 16, it is easiest to have the flat 302 oriented as shown in FIG. 16. Arrow 504 indicates that spring arm movement causes the spring 400 to be trapped in the slot 226'.

Looking at FIGS. 3 and 9, various features of a spring loaded retainer 300 according to an embodiment of the present disclosure will now be described. The spring loaded retainer 300 may comprise a lug receiving portion 306 defining a first maximum outside dimension 308, and a lug receiving slot 310 that extends partially through the lug receiving portion 306, forming a first sidewall 312, a second sidewall 312', and a catch surface 314 (so called as it contacts or nearly contacts the lug of the adapter in use) connecting the first sidewall 312 to the second sidewall 312'. The spring loaded retainer 300 may also include a drive portion 316 defining a second maximum outside dimension 318. A first flat 302 may be disposed on the outside of the lug receiving portion 306 proximate to the first sidewall 312 or the second sidewall 312'.

More particularly when looking at FIG. 9, the lug receiving portion 306 may include a lug receiving cylindrical portion 320 including an outside cylindrical surface 322 defining a radial direction 324, a circumferential direction 326, and a cylindrical axis 328. In such an embodiment, the first maximum outside dimension 308 may take the form of an outside cylindrical surface diameter 330 (see also FIG. 8). Also, and the drive portion 316 may include a drive cylindrical portion 332, and the second maximum outside dimension 318 may take the form of a drive cylindrical portion diameter 334 that is less than the outside cylindrical surface diameter 330 of the lug receiving cylindrical portion 320. The configurations of these features may be something other than cylindrical in other embodiments such as conical, etc.

Still referring to FIG. 9, the first flat 302 may be disposed on the outside cylindrical surface 322, and may be circumferentially aligned with the first sidewall 312 as shown. Optionally, the spring loaded retainer 300 may further comprise a second flat 304 disposed on the outside cylindrical surface 322 that is also circumferentially aligned with the second sidewall 312'. A stop projection 336 may extend axially away from the drive portion 316 that is circumferentially aligned with the first flat 302. Other configurations are possible.

Turning now to FIGS. 10 thru 13, a spring 400 according to an embodiment of the present disclosure will now be discussed.

FIG. 10 shows that the manufacture of the spring 400 may start with a flat pattern 408 made from a metal (e.g. spring steel) that is bent via a progressive stamping die process or similar fabrication technique into the desired final shape. The flat pattern 408 is shown with bend regions 410 indicated that are turned by the folding process into the various arcuate portions of the spring 400 as will now be described.

In FIGS. 11 thru 13, the spring 400 may be turned into a folded body 412 including a flat base 406' defining a front face 414, a rear face 416, a first side edge 418, a second side edge 420, a top edge 422, a bottom edge 424, and a flat base thickness 426 (minimum dimension, see FIG. 13) measured from the front face 414 to the rear face 416 ranging from 0.25 mm to 1.5 mm.

A first spring arm 428 may extend from the first side edge 418 of the flat base 406'. As best seen in FIG. 13, the first spring arm 428 may include a first arcuate portion 430 extending rearwardly from the flat base 406', and a first straight portion 432 extending from the first arcuate portion 430 that is disposed proximate to the rear face 416. That is to say the first spring arm 428 is first folded toward the flat base 406'. The first straight portion 432 may define a first external obtuse angle 434 with the rear face 416 ranging from 120 degrees to 170 degrees, and a first straight portion length 436 ranging from 4.0 mm to 7.0 mm. Other configurations and dimensions are possible for any of these features in other embodiments of the present disclosure.

With continued reference to FIG. 13, the spring 400 may further comprise a second arcuate portion 438 extending rearwardly from the first straight portion 432, and a second straight portion 440 extending from the second arcuate portion 438 that is disposed proximate to the first straight portion 432. The second straight portion 440 may define a second external obtuse angle 442 with the first straight portion 432 ranging from 110 degrees to 160 degrees, and a second straight portion length 444 ranging from 4.0 mm to 7.0 mm. Hence, the first spring arm 428 extends along a first serpentine path from the flat base 406'. Other configurations are possible.

The spring 400 may further comprise a third arcuate portion 446 extending forwardly from the second straight portion 440, and a third straight portion 448 extending from the third arcuate portion 446 that is disposed proximate to the first arcuate portion 430. The third straight portion 448 may define a first external acute angle 450 with the second straight portion 440 ranging from 20 degrees to 60 degrees, and a third straight portion length 452 ranging from 0.75 mm to 3.0 mm. So, a downward ramp angled toward the outside of the spring is formed that may aid in installing the spring 400 into the tip.

FIG. 13 depicts that the flat base 406' may define a midplane 454 disposed between the first side edge 418, and the second side edge 420. The spring 400 may be symmetrical about the midplane 454 such that a second spring arm may extend from the second side edge of the flat base, forming a second serpentine path. This may not be the base for other embodiments. For example, there may only be one spring arm provided or differently configured spring arms may be provided, etc.

As alluded to earlier herein, FIGS. 11 thru 13 show that the spring 400 may have a flange portion 402 extending from bottom edge 424 of the flat base 406'. The flange portion 402 includes a flange arcuate portion 456 extending from the bottom edge 424, and a flange straight portion 458 extending from flange arcuate portion 456. The flange straight portion 458 defines a right angle 460 with the flat base 406'. The flange straight portion 458 may define a flange straight portion length 462 ranging from 2.0 mm to 5.0 mm. Other configurations and dimensions are possible in other embodiments of the present disclosure.

In FIG. 11, the folded body 412 may also define a first bend relief cutout 464 disposed along the first side edge 418 between the first spring arm 428, and the bottom edge 424. A second bend relief cutout 466 may also be disposed along the second side edge 420 between the second spring arm 468 and the bottom edge 424.

Looking at FIG. 12, the flat base 406' may define a flat base vertical length 470 measured from the top edge 422 to the bottom edge 424 ranging from 14.0 mm to 20.5 mm, and a flat base horizontal width 472 measured from the first side edge 418 to the second side edge 420 ranging from 10.0 mm to 14.0 mm.

Figure 18:
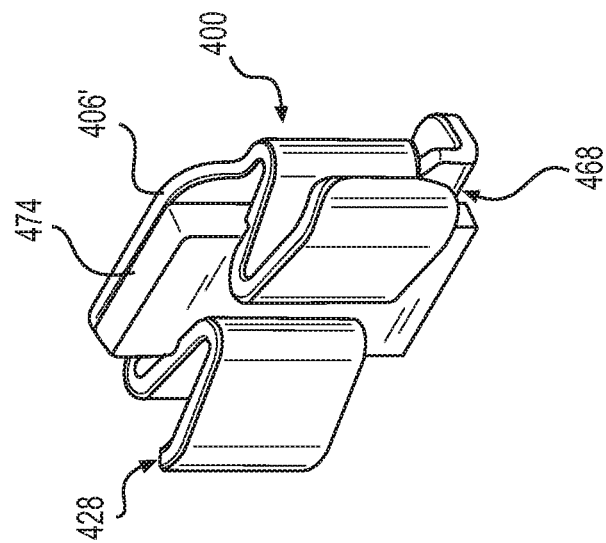
FIG. 18 shows the spring with the insert of FIG. 17 fully assembled.
Figure 17:
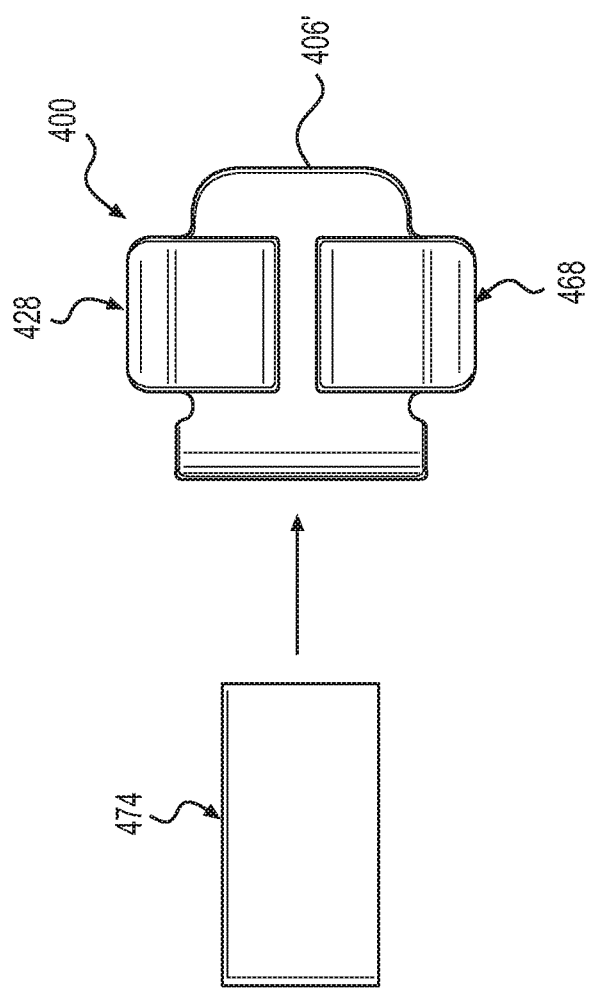
FIG. 17 shows an insert being inserted into the spring of FIG. 11 between the spring arms of the spring and the base of the spring.

In FIGS. 17 and 18, an insert 474 may be disposed between the first and the second spring arms 428, 468 and the flat base 406', being pressed against the rear face 416 of the flat base 406' by the first and the second spring arms 428, 468. The insert 474 may comprise at least one of the following materials: Cellasto®, rubber, and foam. If foam is employed, the foam may be bonded to the flat base 406'. The insert 474 may help to prevent mud or other debris from infiltrating into the spring 400, which may hinder its performance.

FIGS. 2, and 19 thru 22 show an adapter 600 according to an embodiment of the present disclosure with features that may help prevent mud packing or other debris from infiltrating into the adapter nose receiving pocket of the tip after the tip has been assembled onto the adapter. While a version of the adapter shown in these figures is a center adapter, it is to be understood that the adapter may have other configurations including as a corner adapter, etc. Also, the adapter may define a midplane of symmetry as shown in the figures but not necessarily so in other embodiments of the present disclosure.

Figure 19:
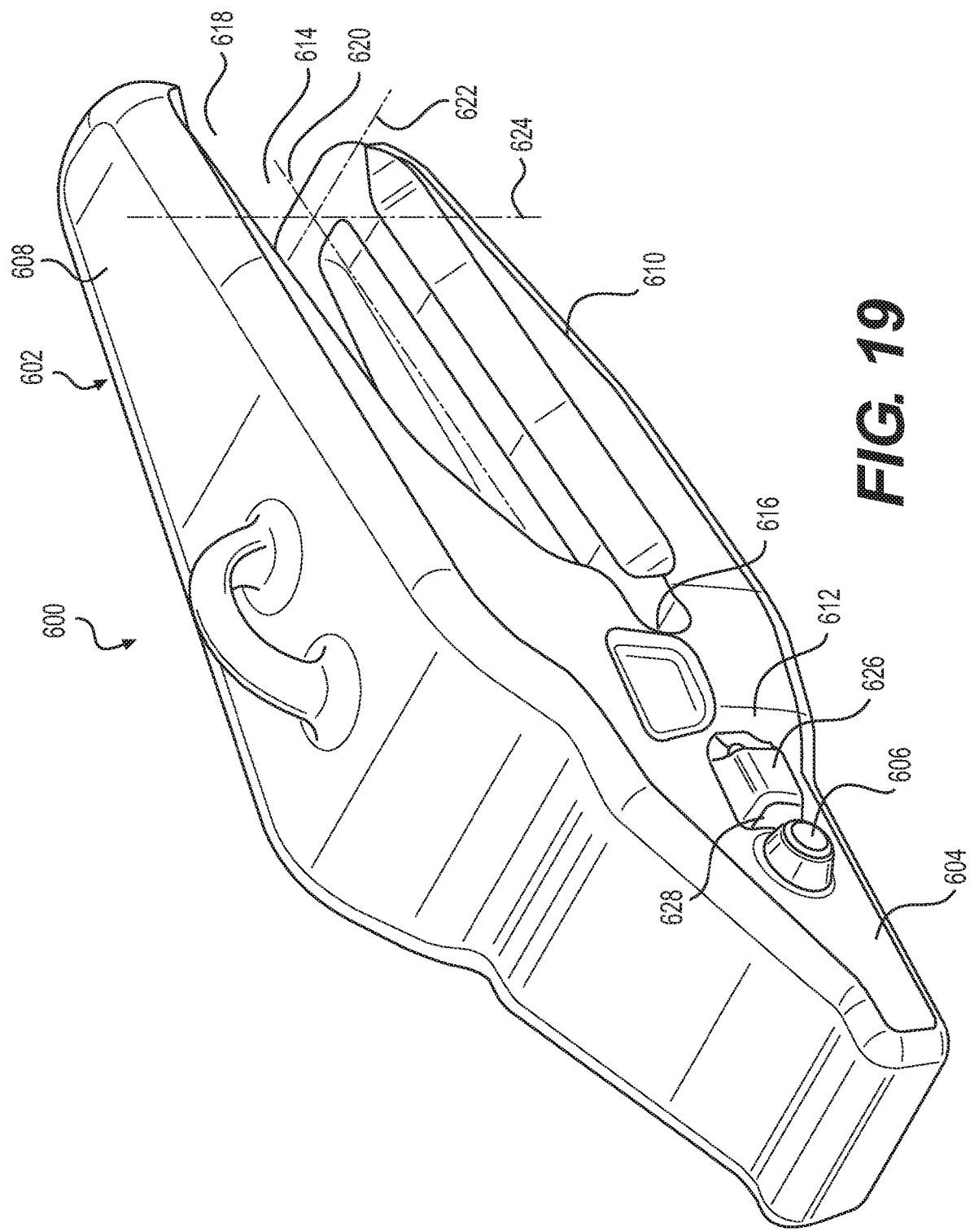
FIG. 19 is a perspective view of the adapter of FIG. 2 shown in isolation, revealing the rail disposed behind the lug on the nose of the adapter according to an embodiment of the present disclosure.

In FIGS. 2 and 19, the adapter 600 may comprise a body 602 that includes a nose portion 604 including a lug 606 extending from the nose portion 604. The body 602 may also include a first leg 608, a second leg 610, and a throat portion 612 that connects the legs 608, 610 and the nose portion 604 together. The first and the second legs 608, 610 and the throat portion 612 define a slot 614 that includes a closed end 616 and an open end 618. Thus, the slot 614 defines a direction of assembly 620 onto a work implement, a lateral direction 622 that is perpendicular to the direction of assembly 620, and a vertical direction 624 that is perpendicular to the direction of assembly 620 and the lateral direction 622.

Focusing on FIGS. 19 and 20, the nose portion 604 may further include a rail 626 disposed behind the lug 606 along the direction of assembly 620. The rail 626 may include a front arcuate surface 628 defining a front arcuate surface radius of curvature 630 ranging from 21.0 mm to 25.0 mm. The front arcuate surface 628 may be spaced away from the lug 606 a first minimum distance 632 ranging from 7.0 mm to 12.0 mm.

Figure 22:
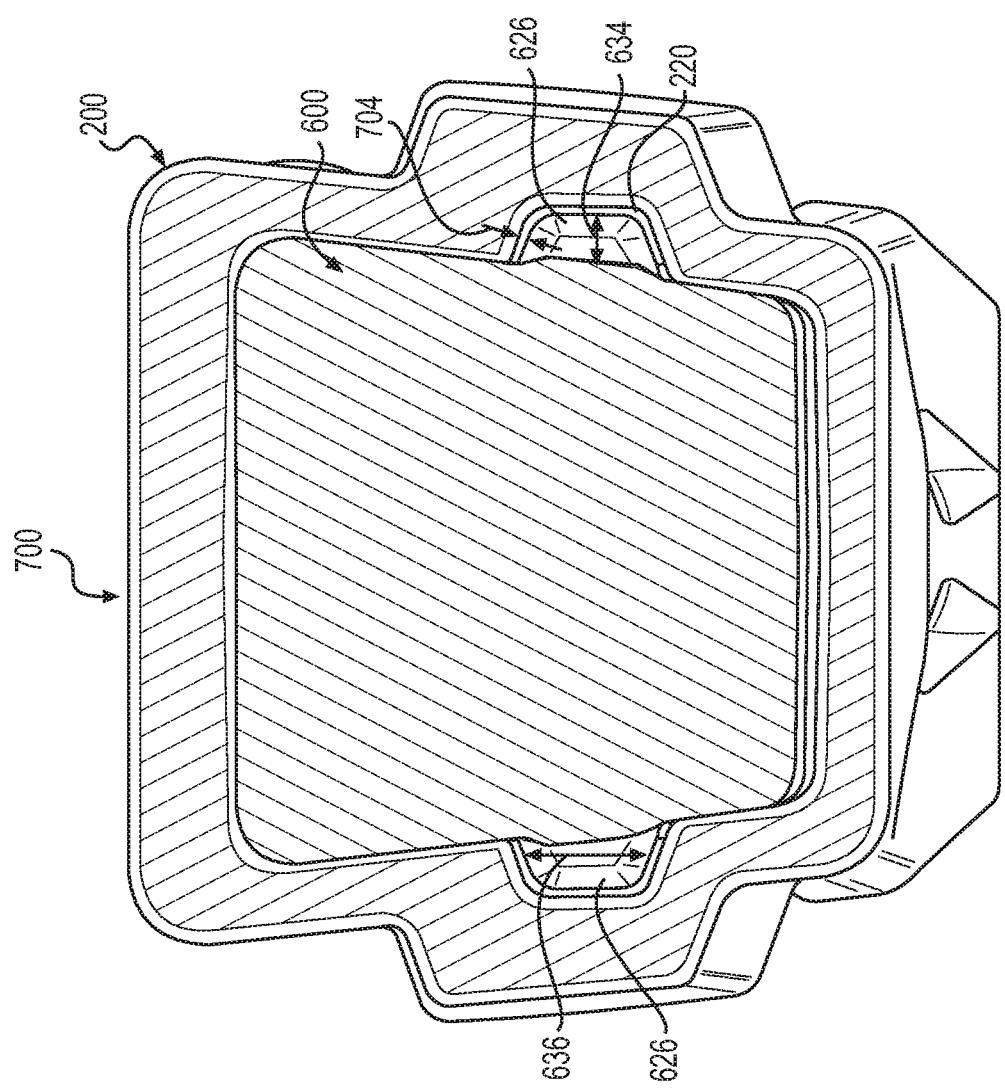
FIG. 22 is a rear sectional view of the tip and adapter of FIG. 2 that enhances the understanding of how the perimeter of the nose and the presence of the rails of the adapter help prevent mud or other debris from entering the adapter nose receiving pocket of the tip without interfering with the assembly of the tip onto the nose of the adapter.

As best seen in FIG. 22, the rail 626 defines a lateral height 634 ranging from 10.0 mm to 16.0 mm, and a vertical width 636 ranging from 25.0 mm to 32.0 mm.

As best seen in FIG. 20, the rail 626 defines a rail length 638 along the direction of assembly 620 ranging from 38.0 mm to 48.0 mm, and includes a rear portion 640 with a rear blend 642 connecting the lug 606 to the throat portion 612.

It is to be understood that the configuration and dimensions associated with these features may be varied to be different in other embodiments of the present disclosure.

Referring again to FIG. 22, a tip and adapter assembly 700 according to an embodiment of the present disclosure may be characterized as follows. The tip and adapter assembly 700 may comprise a tip 200 and an adapter 600 with similar or identical configurations as previously discussed herein. The tip and adapter assembly 700 may further includes a spring loaded retainer 300, 300' mounted on the lug (see FIGS. 2 and 21).

As best seen in FIG. 21, the rail 626 may be spaced away from the spring loaded retainer 300, 300' a first minimum clearance distance 702 ranging from 1.0 mm to 8.0 mm. This may help to ensure that the spring loaded retainer is free to rotate as needed.

In FIG. 22, it can be seen that the rail 626 may be spaced away from the tip 200 in the adapter nose lug receiving groove 220 of the tip 200 a second minimum clearance distance 704 ranging from 1.0 mm to 6.0 mm. This may help to ensure that the tip can be installed onto the adapter without interference while also helping to limit mud packing or other debris from entering into the adapter nose receiving pocket of the tip.

Again, it should be noted that any of the dimensions, angles, surface areas and/or configurations of various features may be varied as desired or needed including those not specifically mentioned herein. Although not specifically discussed, blends such as fillets are shown to connect the various surfaces. These may be omitted in other embodiments and it is to be understood that their presence may be ignored sometimes when reading the present specification unless specifically mentioned.

INDUSTRIAL APPLICABILITY

In practice, a machine, a work implement assembly, a tip, an adapter, a tip assembly, a tip and adapter assembly, a spring, a spring loaded retainer, and/or any combination of these various assemblies and components may be manufactured, bought, or sold to retrofit a machine or a work implement assembly in the field in an aftermarket context, or alternatively, may be manufactured, bought, sold or otherwise obtained in an OEM (original equipment manufacturer) context.

Any of the aforementioned components may be made from any suitable material including iron, grey-cast iron, steel, spring steel, plastic, rubber, foam, etc.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A spring comprising:
    a folded body including
        a flat base defining a front face, a rear face, a first side edge, a second side edge, a top edge, a bottom edge, and a flat base thickness measured from the front face to the rear face; and
        a first spring arm extending from the first side edge of the flat base, the first spring arm including a first arcuate portion extending rearwardly from the flat base, a first straight portion extending from the first arcuate portion and disposed proximate to the rear face, the first straight portion defining a first external obtuse angle with the rear face, and a first straight portion length, and a second arcuate portion extending rearwardly from the first straight portion, and a second straight portion extending from the second arcuate portion;
    wherein the second straight portion defines a second straight portion length, and a majority of the second straight portion length is disposed horizontally between the first side edge and the second side edge, the first external obtuse angle ranges from 120 degrees to 170 degrees, and the first straight portion length ranges from 4.0 mm to 7.0 mm, and further defining a second external obtuse angle with the first straight portion ranging from 110 degrees to 160 degrees forming a first serpentine path, and the second straight portion length ranging from 4.0 mm to 7.0 mm.

2. The spring of claim 1 wherein the flat base thickness measures from 0.25 mm to 1.5 mm.

3. The spring of claim 2 further comprising a third arcuate portion extending forwardly from the second straight portion, and a third straight portion extending from the third arcuate portion and disposed proximate to the first arcuate portion, the third straight portion defining a first external acute angle with the second straight portion ranging from 20 degrees to 60 degrees forming a ramp, and a third straight portion length ranging from 0.75 mm to 3.0 mm.

4. The spring of claim 1 wherein the flat base defines a midplane disposed between the first side edge and the second side edge, and the spring is symmetrical about the midplane.

5. The spring of claim 1 further comprising a flange portion extending forwardly from the bottom edge of the flat base, and lacking a flange extending from top edge of the flat base.

6. The spring of claim 5 wherein the flange portion includes a flange arcuate portion extending from the bottom edge, and a flange straight portion extending from flange arcuate portion, the flange straight portion defining a right angle with the flat base.

7. The spring of claim 6 wherein the flange straight portion defines a flange straight portion length ranging from 2.0 mm to 5.0 mm.

8. The spring of claim 6 wherein the folded body defines a first bend relief cutout disposed along the first side edge between the first spring arm and the bottom edge.

9. The spring of claim 8 further comprising a second spring arm extending from the second side edge and wherein the folded body further defines a second bend relief cutout disposed along the second side edge between the second spring arm and the bottom edge.

10. The spring of claim 1 wherein the flat base defines a flat base vertical length measured from the top edge to the bottom edge ranging from 14.0 mm to 20.5 mm, and a flat base horizontal width measured from the first side edge to the second side edge ranging from 10.0 mm to 14.0 mm.

11. The spring of claim 9 further comprising an insert disposed between the first and the second spring arms and the flat base, being pressed against the rear face of the flat base by the first and the second spring arms.

12. The spring of claim 11 wherein the insert comprises at least one of the following materials: polyurethane elastomer, rubber, and foam.

13. The spring of claim 12 wherein the foam is bonded to the flat base.

14. A spring comprising:
    a folded body including
        a flat base defining a front face, a rear face, a first side edge, a second side edge, a top edge, a bottom edge;
        a first spring arm extending from the first side edge of the flat base, the first spring arm including a first arcuate portion extending rearwardly from the flat base, a first straight portion extending from the first arcuate portion and disposed proximate to the rear face, and a second arcuate portion extending rearwardly from the first straight portion, and a second straight portion extending from the second arcuate portion and disposed proximate to the first straight portion such that the first spring arm forms a first serpentine path; and
    an insert disposed between the first spring arm, and the flat base, the insert being pressed against the rear face of the flat base by the first spring arm;
    wherein the second straight portion terminates horizontally between the first arcuate portion and the second side edge.

15. The spring of claim 14 wherein the flat base defines a midplane disposed between the first side edge and the second side edge, and the spring is symmetrical about the midplane such that a second spring arm extends from the second side edge of the flat base, the second spring arm forms a second serpentine path.

16. The spring of claim 14 further comprising a third arcuate portion extending forwardly from the second straight portion, the third arcuate portion being disposed horizontally proximate to the first arcuate portion, and a third straight portion extending from the third arcuate portion and that is disposed horizontally proximate to the first arcuate portion, forming a ramp;
    wherein the insert the insert comprises at least one of the following materials: polyurethane elastomer, rubber, and foam.

* * * * *